(12) United States Patent
Krehmer

(10) Patent No.: US 11,027,587 B2
(45) Date of Patent: Jun. 8, 2021

(54) GEARING ARRANGEMENT FOR AN ACTUATOR DEVICE FOR HEIGHT ADJUSTMENT OF A VEHICLE BODY

(71) Applicant: Schaeffler Technologies AG & Co. KG, Herzogenaurach (DE)

(72) Inventor: Hartmut Krehmer, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 44 days.

(21) Appl. No.: 16/500,236

(22) PCT Filed: Mar. 23, 2018

(86) PCT No.: PCT/DE2018/100261
§ 371 (c)(1),
(2) Date: Oct. 2, 2019

(87) PCT Pub. No.: WO2018/196911
PCT Pub. Date: Nov. 1, 2018

(65) Prior Publication Data
US 2020/0055361 A1 Feb. 20, 2020

(30) Foreign Application Priority Data
Apr. 28, 2017 (DE) .......................... 102017109145.9

(51) Int. Cl.
*B60G 17/005* (2006.01)

(52) U.S. Cl.
CPC ...... *B60G 17/005* (2013.01); *B60G 2204/419* (2013.01); *B60G 2400/252* (2013.01); *B60G 2500/30* (2013.01); *B60G 2800/914* (2013.01)

(58) Field of Classification Search
CPC ............ B60G 17/005; B60G 2204/419; B60G 2400/252; B60G 2500/30;
(Continued)

(56) References Cited

U.S. PATENT DOCUMENTS

| 4,747,319 A |   | 5/1988 | Sakuta |
|---|---|---|---|
| 5,553,836 A | * | 9/1996 | Ericson .................. B60G 11/16 267/177 |

(Continued)

FOREIGN PATENT DOCUMENTS

| DE | 3642938 | 6/1987 |
|---|---|---|
| DE | 102014209939 | 11/2015 |

(Continued)

*Primary Examiner* — Darlene P Condra
(74) *Attorney, Agent, or Firm* — Volpe Koenig

(57) ABSTRACT

A gearing arrangement for an actuator device for height adjustment of a vehicle body is provided, having a drive wheel and an output wheel, which are rotatably connected to each other by a tooth system formed on each. A blocking element is arranged on the output wheel to block a rotational movement, and a guide track having a blocking stop integrated therein and at least one deflection position; the guide track is connected to a pin section, which is movable to a limited degree and which is provided in order to be guided along the guide track upon rotation of the output wheel and to block a rotational movement of the output wheel upon penetrating into the blocking stop. By using the at least one deflection position, the rotative position of the blocking element can be detected during guiding of the pin section by the at least one deflection position.

17 Claims, 2 Drawing Sheets

(58) Field of Classification Search
CPC .......... B60G 2800/914; B60G 2202/42; B60G 2202/442; B60G 2204/423; B60G 17/02; B60G 2204/45; F16H 2035/005
See application file for complete search history.

(56) References Cited

U.S. PATENT DOCUMENTS

| | | | |
|---|---|---|---|
| 2007/0063570 A1* | 3/2007 | Yoshida | B60N 2/1615 |
| | | | 297/452.49 |
| 2016/0221410 A1* | 8/2016 | Mersmann | B60G 17/005 |
| 2017/0028805 A1* | 2/2017 | Krehmer | B60G 11/16 |
| 2017/0197484 A1* | 7/2017 | Mersmann | B60G 15/07 |

FOREIGN PATENT DOCUMENTS

| | | |
|---|---|---|
| DE | 102015224862 | 6/2017 |
| DE | 102016218919 | 3/2018 |
| WO | 2018036584 | 3/2018 |

* cited by examiner

GEARING ARRANGEMENT FOR AN ACTUATOR DEVICE FOR HEIGHT ADJUSTMENT OF A VEHICLE BODY

BACKGROUND

The disclosure relates to a gearing arrangement for an actuator device for height adjustment of a vehicle body. Height adjustment of vehicle bodies serves to increase the ground clearance of motor vehicles and to lower said vehicles on level surfaces. For this purpose, a device for height adjustment of the vehicle body comprising an actuator device is provided in the suspension struts of the motor vehicles, for example, wherein the device for height adjustment of the vehicle body is driven by the actuator device.

DE 10 2014 209 939 A1, for example, discloses a design for a gearing arrangement and actuator device having a blocking function. The gearing arrangement has an input wheel, which is arranged so as to be rotatable around an input axis and which has a geared input section in the direction of revolution. The gearing arrangement furthermore has an output wheel, which is arranged so as to be rotatable around an output axis and which has a geared output section in the direction of revolution, wherein the geared input section and the geared output section can be brought into engagement by a rotation of the input wheel, with the result that the gearing arrangement is in a driving state. Here, the input wheel has an input blocking section and the output wheel has an output blocking section. The input blocking section and the output blocking section can be brought into engagement with one another by a further rotation of the input wheel out of the driving state, with the result that the gearing arrangement is in a blocking state.

SUMMARY

It is the object of the disclosure to further develop a gearing arrangement for an actuator device for height adjustment of a vehicle body, wherein, in contrast to the above-mentioned prior art, the gearing arrangement is to have a constant transmission ratio and a mechanical blocking function.

According to the disclosure, this object is achieved by one or more of the features disclosed herein. Advantageous embodiments will become apparent from the claims, the description and the drawings.

According to the disclosure, a gearing arrangement for an actuator device for height adjustment of a vehicle body comprises an input wheel and an output wheel, which are rotatably connected to each other by a tooth system formed on each, wherein a blocking element for blocking a rotational movement is arranged on the output wheel, wherein the blocking element has at least one guide track having at least one blocking stop integrated therein and at least one deflection location, wherein the at least one guide track is connected to a pin section, which is movable to a limited extent and which is provided so as to be guided along the at least one guide track upon rotation of the output wheel and to block a rotational movement of the output wheel upon penetrating into the at least one blocking stop, and wherein, by the at least one deflection location, the rotative position of the blocking element can be detected during the guidance of the pin section by the at least one deflection location.

The deflection location is designed in such a way that, during guidance of the pin element by the deflection location, a defined rotation angle or a linear travel of the pin element can be measured, for example, whereby the rotative position of the blocking element is detected by a measuring device, for example. During each revolution of the output wheel, the deflection location forms a reference point for the rotative position of the blocking element, thereby making it possible to calculate how far and in which direction of rotation the blocking element must be rotated in order to initiate the blocking position. As an alternative, it is also possible for the blocking element to be arranged on the input wheel, on a device for level adjustment of a vehicle body, or on some other element of the gearing arrangement.

As an alternative, it is also possible for the guide track to have two or more deflection locations, which have substantially different characteristic shapes or profiles, thereby making it possible to shorten the intervals between the measurements of the rotative position of the blocking element. The deflection locations can be arranged at equal distances from one another on the guide track. However, it is also possible for the deflection locations to be arranged at different distances from one another on the guide track.

The pin section is preferably formed on a lever arm, wherein the lever arm is pivotable about an axis of rotation, wherein the pin section engages radially or axially in the at least one guide track, and wherein the lever arm is provided for the purpose of detecting the rotative position of the blocking element by a rotation angle during the guidance of the pin section by the at least one deflection location.

The blocking element is preferably a blocking ring, wherein the guide track is formed on a cylindrical lateral surface of the blocking element, wherein the pin section engages in a radial direction in the guide track and is deflected in an axial direction relative to the output wheel. Consequently, the lever arm is designed to be pivotable substantially in an axial direction relative to the output wheel, wherein the pin section moves up and down along a circular track. The blocking element is of annular design and is arranged for conjoint rotation on the front face of the output wheel. In particular, the blocking element is a separate ring, which is connected to the output wheel for conjoint rotation therewith. It is furthermore possible for the blocking element to be integrated into the output wheel.

The blocking element is preferably a blocking disk, wherein the guide track is formed on the front face. The pin section and thus also the lever arm are deflected in a radial direction relative to the output wheel. Consequently, the lever arm is designed to be pivotable in a radial direction relative to the output wheel, wherein the pin section moves along a circular track. Depending on the use, this can be advantageous in respect of the installation space of the gearing arrangement. The penetration of the pin section into the at least one blocking stop of the guide track ensures positive-locking retention of the output wheel in one direction of rotation.

The rotation angle of the lever arm can be determined, for example, by a measuring device, wherein the measuring device determines a rotation angle for each location of the pin section in the guide track, and wherein the measuring device determines a defined value of the rotation angle during the guidance of the pin section by the deflection location of the guide track and thus detects the rotative position of the blocking element or of the output wheel. As an alternative, a rotation angle profile, by which the rotative position of the locking element can be detected, can be predefined.

In particular, the pin section is formed integrally on the lever arm. In this case, the lever arm is mounted at least indirectly on a housing. For example, the lever arm is connected to a fastening element by fastening means. As an alternative, the pin section can be arranged movably on the housing via the lever arm and a sliding guide connected thereto.

According to a preferred illustrative embodiment, the lever arm has a clamping fit relative to a component fixed in a stationary position, wherein the guide track sets the location of the lever arm counter to a friction force of the clamping fit. Consequently, the lever arm is deflected only if the profile of the guide track imposes this upon the pin section or lever arm The at least one guide track preferably has a first and a second guide track section. A guide track section should be taken to mean a part of the guide track which is provided for the purpose of guiding the pin section of the lever arm along the blocking element and thereby at least partially deflecting the lever arm. The two guide sections can merge seamlessly into one another or can be connected to one another by connecting sections, for example, in order to achieve a changeover of the pin section between the two guide sections.

In particular, the pin section can be guided substantially along the first guide track section in the case of a first direction of rotation of the output wheel, wherein the pin section can be guided substantially along the second guide track section in the case of a second direction of rotation of the output wheel, and wherein the second guide track section has the blocking stop.

If the guide track is formed on a cylindrical lateral surface of the blocking element, the first guide track section is formed axially above the blocking stop, and the second guide track section is formed axially below the blocking stop. In other words, the blocking stop is arranged axially between the first and the second guide track section. In particular, the pin section is guided along the second or lower guide track section in the case of a counterclockwise rotation of the blocking element. If the blocking element rotates clockwise, the pin section is guided essentially along the first or upper guide track section. As an alternative, it is also possible for the blocking element with the guide track on a cylindrical lateral surface of the blocking element to be formed the other way round, with the result that the pin section is guided along the second or lower guide track section, in particular in the case of a clockwise rotation of the blocking element. If the blocking element rotates counterclockwise, the pin section is guided essentially along the first or upper guide track section.

If the guide track is formed on the front face of the blocking element, the first guide track section is formed radially on the outside and the second guide track section radially on the inside on the blocking disk. In other words, the blocking stop is arranged radially between the first and the second guide track section. In particular, the pin section is guided along the first or outer guide track section in the case of a counterclockwise rotation of the blocking element. If the blocking element rotates clockwise, the pin section is guided essentially along the second or inner guide track section. As an alternative, it is also possible for the blocking element with the guide track on the front face to be formed the other way round, with the result that the pin section is guided along the first or outer guide track section, in particular in the case of a clockwise rotation of the blocking element. If the blocking element rotates counterclockwise, the pin section is guided essentially along the second or inner guide track section.

The disclosure includes the technical teaching that the pin section is arranged on a linear guide, wherein the linear guide is provided for the purpose of guiding the pin section along a linear axis and, by a linear travel, of detecting the rotative position of the blocking element during the guidance of the pin section by the deflection location, and wherein the pin section engages radially or axially in the at least one guide track.

The at least one guide track is preferably formed on a cylindrical lateral surface of the blocking element, wherein the pin section is deflected in an axial direction relative to the output wheel. The blocking element is thus designed as a blocking ring. Consequently, the pin section is moved up and down on the linear axis of the linear guide, wherein the linear guide is fixed in a stationary manner.

As an alternative, it is also possible for the at least one guide track to be arranged on the front face of the blocking element, with the result that the pin section is deflected in a radial direction relative to the output wheel. The blocking element is thus designed as a blocking disk. Consequently, the pin section can be moved in a radial direction relative to the output wheel within the linear guide, wherein the pin section is moved backward and forward on the linear axis, wherein the linear guide is fixed in a stationary manner. Depending on the use, this can be advantageous in respect of the installation space of the gearing arrangement. The linear guide is mounted at least indirectly on a housing.

The linear travel of the pin section within the linear guide can be determined, for example, by a measuring device, wherein the measuring device determines a defined value of the linear travel during the guidance of the pin section by the deflection location of the guide track and thus detects the rotative position of the blocking element or of the output wheel. As an alternative, a travel profile, by which the rotative position of the blocking element can be detected, can be predefined.

The invention furthermore relates to an actuator device for height adjustment of a vehicle body by the abovementioned gearing arrangement. The output wheel is preferably connected at least indirectly to a rotatable component of the actuator device for height adjustment of a vehicle body. In particular, the gearing arrangement according to the disclosure is part of this actuator device, wherein the actuator device is arranged either between the vehicle body and a running gear spring or between the running gear spring and a wheel carrier. In the first case, the actuator device can be arranged on the upper spring plate of the running gear spring. In the second case, the actuator device can be arranged on the lower spring plate of the running gear spring. The device for height adjustment of the vehicle body is preferably formed by a lead screw, which has a threaded spindle arranged along a lifting axis and forming a first lifting part, and a spindle nut, which forms a second lifting part. In particular, the lead screw is formed by a ball screw, the balls of which roll on ball grooves wound helically around the spindle axis on the spindle nut and the threaded spindle. By using ball screws of this kind, reliable actuating movements of the actuator device can be performed.

BRIEF DESCRIPTION OF THE DRAWINGS

Illustrative embodiments of the disclosure are explained in greater detail below with reference to the drawings. In the drawing.

DETAILED DESCRIPTION

Figure 1:
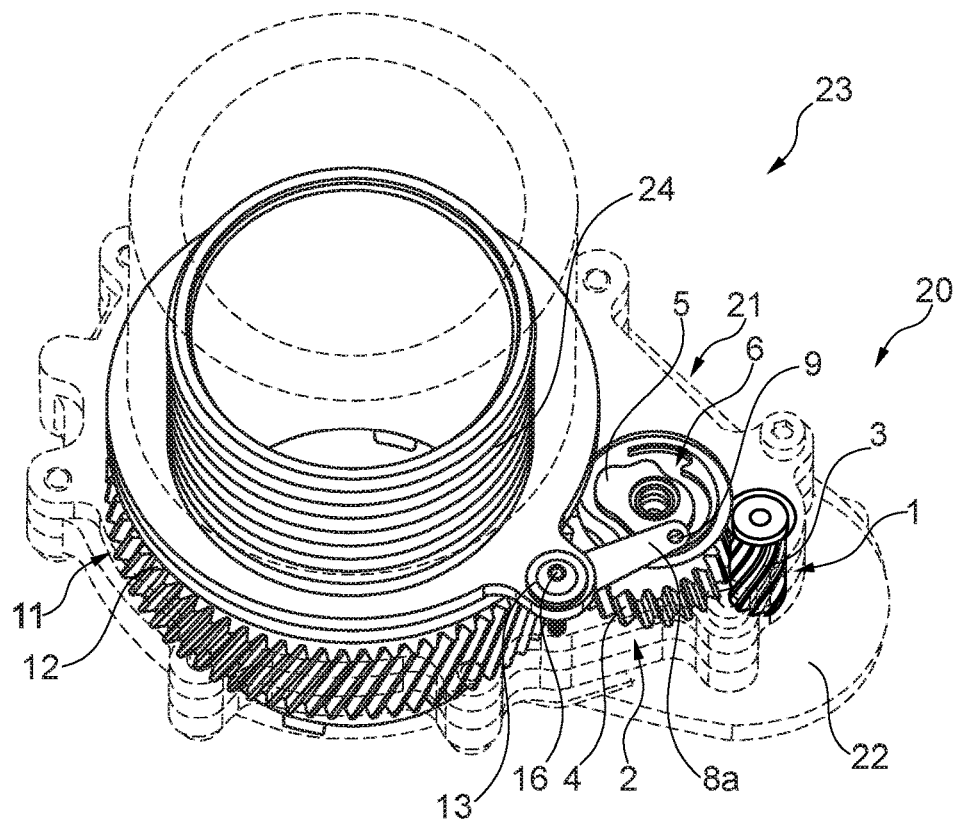
FIG. 1 shows a schematic, partially transparent perspective illustration of an actuator device for height adjustment having a gearing arrangement according to the disclosure, in accordance with a first illustrative embodiment.

According to FIG. 1, a gearing arrangement 21 according to the disclosure for an actuator device 20 for height adjustment of a vehicle body—not illustrated here—comprises an input wheel 1 and an output wheel 2, which are rotatably connected to each other by a tooth system 3, 4 formed on each. The actuator device 20 drives a gearwheel 11 of a device 23—illustrated only in part here—for height adjustment of the vehicle body, wherein a tooth system 12 formed on the gearwheel 11 is in mesh with the tooth system 4 of the output wheel 2. The gearwheel 11 can be designed as a spindle nut in order to carry out a height adjustment of the vehicle body when rotated by a lead screw 24. A blocking element 5 is furthermore arranged on the output wheel 2, wherein the blocking element 5 is arranged for conjoint rotation on the front face of the output wheel 2. The blocking element 5 is designed as a blocking disk and has a guide track 6 formed on the front face thereof. As an alternative, it is also possible for the blocking element 5 to be integrated into or formed integrally with the output wheel 2 on the front face.

The actuator device 20 can be driven by a drive motor—not illustrated here—which is connected to the input wheel 1 for conjoint rotation therewith. The gearing arrangement 21 furthermore comprises a fastening element 13, on which a lever arm 8a is mounted for limited horizontal movement. The fastening element 13 can be fastened to a housing 22 of the actuator device 20, for example. Arranged at the distal end of the lever arm 8a is a pin section 9, which engages in the guide track 6 of the blocking element 5 axially with respect to the output wheel 2.

Figure 2:
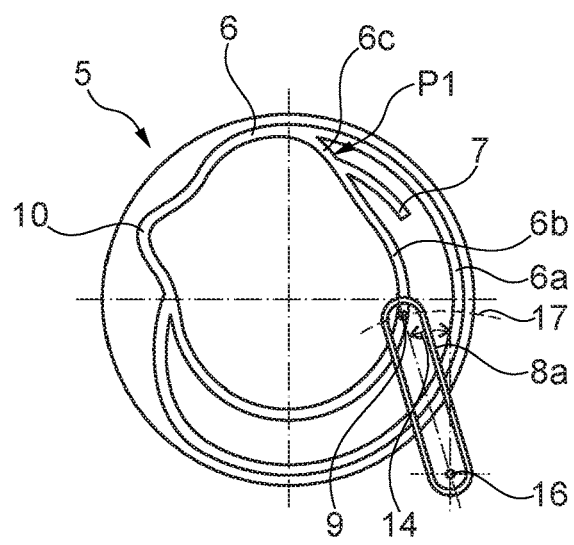
FIG. 2 shows a schematic plan view of a blocking element of the gearing arrangement according to the disclosure having a lever arm, in accordance with the first illustrative embodiment.

In FIG. 2, in accordance with the first illustrative embodiment, the guide track 6 of the blocking element 5 is connected to the lever arm 8a in such a way that the lever arm 8a is guided in a horizontal plane along the guide track 6 in the case of a rotation of the output wheel 2. The lever arm 8a is therefore designed to be pivotable by a rotation angle 14 about an axis of rotation 16. According to this embodiment, the lever arm 8a has a clamping fit. The location of the lever arm 8a is set by the guide track 6 of the blocking element 5. The pin section 9 engages axially in the guide track 6. In the case of a rotation of the blocking element 5, the pin section 9 moves backward and forward along a circular path 17 in a radial direction relative to the blocking element 5, wherein the guide track 6 on the blocking element 5 sets the location of the pin section 9.

As a blocking position is initiated, the pin section 9 comes to rest against the blocking stop 7. Consequently, the pin section 9 penetrates into the blocking stop 7 to block a rotational movement of the output wheel 2 illustrated in FIG. 1. The guide track 6 furthermore has a deflection location 10, by which the rotative position of the blocking element 5 can be detected during the guidance of the pin section 9 by the deflection location 10. The rotation angle 14 of the lever arm 8a is measured, for example, by a measuring device—not illustrated here. During the rotation of the blocking element 5, the lever arm 8a has a particular rotation angle 14 at each location of the pin section 9 in the guide track 6. The deflection location 10 is designed in such a way that, during guidance of the pin element 9 by the deflection location 10, a defined rotation angle 14 of the lever arm 8a is measured, whereby the rotative position of the blocking element 5 is detected. Thus, the deflection location 10 during each revolution of the output wheel 2 is the reference point for the rotative position of the blocking element 5, thereby making it possible to calculate how far and in which direction of rotation the blocking element 5 must be rotated in order to initiate the blocking position.

Figure 3:
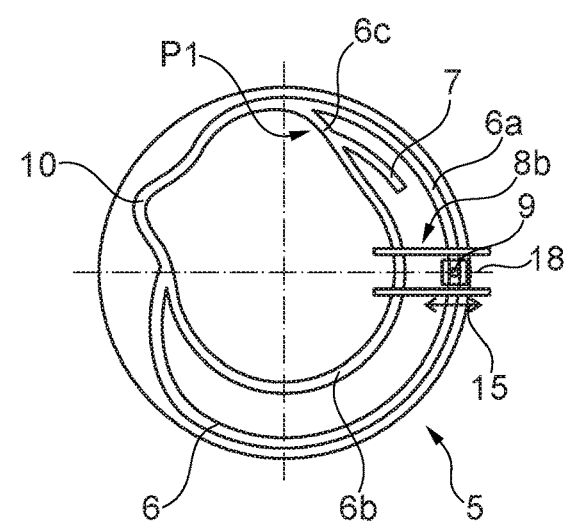
FIG. 3 shows a schematic plan view of a blocking element of the gearing arrangement according to the disclosure having a linear guide, in accordance with a second illustrative embodiment.

FIG. 3 shows a second illustrative embodiment of the gearing arrangement 21, wherein a pin section 9 is arranged on a linear guide 8b, which is of fixed-location design. The linear guide 8b is provided for the purpose of guiding the pin section 9 along a radial axis 18. The pin section 9 engages axially in the guide track 6 on the blocking element 5. In the case of a rotation of the blocking element 5, the pin section 9 moves backward and forward along the radial axis 18 in a radial direction relative to the blocking element 5, wherein the guide track 6 on the blocking element 5 sets the location of the pin section 9.

As a blocking position is initiated, the pin section 9 comes to rest against the blocking stop 7. Consequently, the pin section 9 penetrates into the blocking stop 7 to block a rotational movement of the output wheel 2. The guide track 6 furthermore has a deflection location 10, by which the rotative position of the blocking element 5 can be detected during the guidance of the pin section 9 by the deflection location 10. The linear travel 15 of the pin section 9 within the linear guide 8b is measured, for example, by a measuring device—not illustrated here. During the rotation of the blocking element 5, the pin section 9 has a certain value of the linear travel 15 at each location in the guide track 6. The deflection location 10 is designed in such a way that, during guidance of the pin element 9 by the deflection location 10, a defined linear travel 15 of the pin section 9 occurs and is measured, whereby the rotative position of the blocking element 5 is determined. Thus, the deflection location 10 during each revolution of the output wheel 2 is the reference point for the rotative position of the blocking element 5, thereby making it possible to calculate how far and in which direction of rotation the blocking element 5 must be rotated in order to initiate the blocking position.

Figure 4:
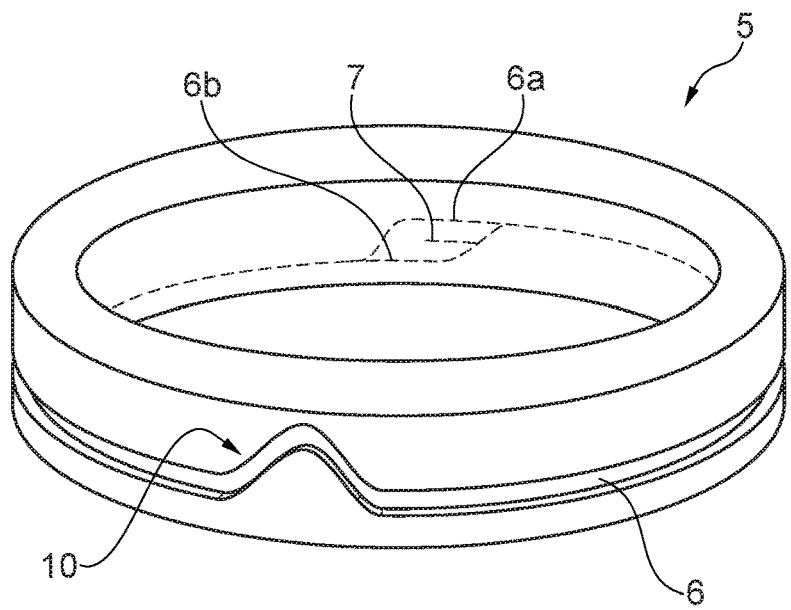
FIG. 4 shows a schematic perspective illustration of a gearing arrangement according to the disclosure in accordance with a third illustrative embodiment.

According to FIG. 4, the blocking element 5 according to a third illustrative embodiment is of annular design and is arranged for conjoint rotation on the front face of an output wheel 2 or input wheel 1—not illustrated here. A guide track 6 with a deflection location 10 is formed on the outer circumference of the blocking element 5. The guide track 6 furthermore has a first and a second guide track section 6a, 6b and a blocking stop 7, which are illustrated in greater detail in FIGS. 5 and 6. A pin section 9 illustrated in FIGS. 5 and 6 can be guided in the guide track 6, wherein the pin section 9 is arranged on a lever arm 8a (as per FIG. 5) or on a linear guide 8b (as per FIG. 6), for example.

Figure 5:
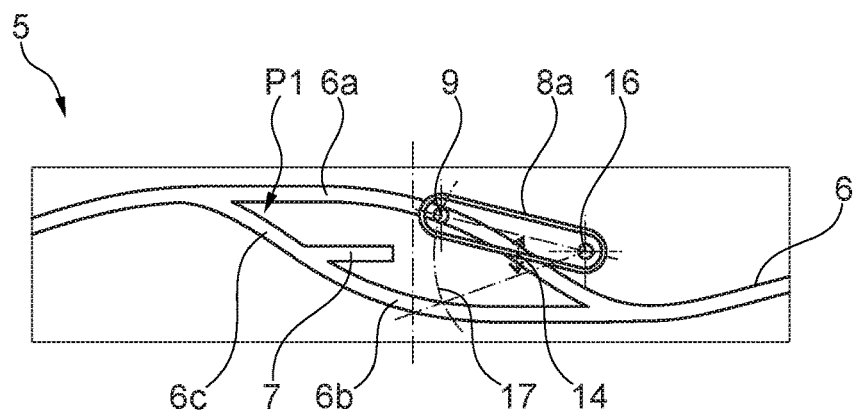
FIG. 5 shows a schematic side view of a blocking element of the gearing arrangement according to the disclosure having a lever arm, in accordance with the third illustrative embodiment.
Figure 6:
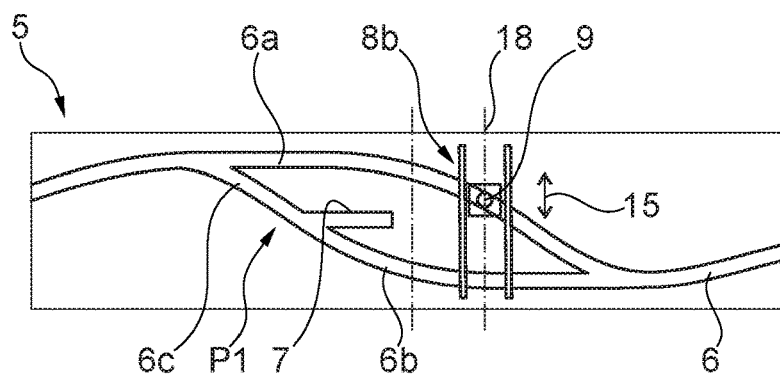
FIG. 6 shows a schematic side view of a blocking element of the gearing arrangement according to the disclosure having a linear guide, in accordance with a fourth illustrative embodiment.

FIGS. 5 and 6 show the third and fourth embodiments of the blocking element 5. The guide track 6 is formed circumferentially on the blocking element 5 and, in addition to the deflection location 10 illustrated in FIG. 4 on one section of the blocking element 5, has two guide track sections 6a, 6b. A blocking stop 7 is formed axially between the upper and the lower guide track section 6a, 6b. The blocking stop 7 is connected to the upper and the lower guide section 6a, 6b and can be introduced merely by a reversal of the direction of rotation of the output wheel 2. To block a rotational movement of the output wheel 2 moving counterclockwise, a reversal of the direction of rotation takes place at a point of reversal P1 of the direction of rotation in a guide section 6c positioned upstream of the blocking section 7. If the output wheel 2 is turned clockwise, a first reversal of the direction of rotation first of all takes place independently of the location, and a second reversal of the direction of rotation takes place at the point of reversal P1 of the direction of rotation in the upstream guide section 6c.

According to FIG. 5, a pin section 9 is formed on a lever arm 8a, wherein the lever arm 8a is pivotable through a rotation angle 14 about an axis of rotation 16 leading perpendicularly into the plane of the drawing, and wherein the pin section 9 engages radially in the guide track 6 on the blocking element 5. The guide track 6 is thus formed on an outer circumferential surface of the blocking element 5. The guide track 6 is connected to the lever arm 8a in such a way that the lever arm 8a is guided upward and downward in a vertical direction along the guide track 6 during a rotation of the output wheel 2. The lever arm 8a can be fastened to a housing 22—not illustrated here—by fastening elements 13—not illustrated here—for example. In the case of a rotation of the blocking element 5, the pin section 9 moves up and down along a circular path 17 in an axial direction relative to the blocking element 5, wherein the guide track 6 on the blocking element 5 sets the location of the pin section 9. Using the rotation angle 14 of the lever arm 8a, the rotative position of the blocking element 5 is detected, wherein the rotation angle 14 is measured by a measuring device—not illustrated here—for example. During the rotation of the blocking element 5, a particular rotation angle 14 can be determined at each location of the pin section 9 in the guide track 6. The deflection location 10 is designed in such a way that, during guidance of the pin element 9 by the deflection location 10, a defined rotation angle 14 of the lever arm 8a occurs and is measured, whereby the rotative position of the blocking element 5 is determined. Thus, the deflection location 10 during each revolution of the output wheel 2 is the reference point for the rotative position of the blocking element 5, thereby making it possible to calculate how far and in which direction of rotation the blocking element 5 must be rotated in order to initiate the blocking position. As the blocking position is initiated, the pin section 9 comes to rest against the blocking stop 7. Consequently, the pin section 9 penetrates into the blocking stop 7 to block a rotational movement of the output wheel 2.

According to FIG. 6, a pin section 9 is arranged in a linear guide 8b, wherein the linear guide 8b is of fixed-location design and is provided for the purpose of guiding the pin section 9 along an axial axis 23. A linear travel 15 of the pin section 9 in the linear guide is measured by a measuring device—not illustrated here—for example. The pin section 9 engages radially in the guide track 6 on the blocking element 5. The guide track 6 is thus formed on an outer circumferential surface of the blocking element 5. In the case of a rotation of the blocking element 5, the pin section 9 moves up and down along the axial axis 18 in an axial direction relative to the blocking element 5, wherein the guide track 6 on the blocking element 5 sets the location of the pin section 9. The linear guide 8b is of fixed-location design. During the rotation of the blocking element 5, the pin section 9 has a certain value for the linear travel 15 for each location in the guide track 6. The deflection location 10 is designed in such a way that, during guidance of the pin element 9 by the deflection location 10, a defined linear travel 15 of the pin section 9 is measured, whereby the rotative position of the blocking element 5 is determined. Thus, the deflection location 10 during each revolution of the output wheel 2 is the reference point for the rotative position of the blocking element 5, thereby making it possible to calculate how far and in which direction of rotation the blocking element 5 must be rotated in order to initiate the blocking position.

LIST OF REFERENCE SIGNS 1 input wheel
2 output wheel
3 tooth system on the input wheel
4 tooth system on the output wheel
5 blocking element
6 guide track
6a, 6b, 6c guide track section
7 blocking stop
8a lever arm
8b linear guide
9 pin section
10 deflection location
11 gearwheel
12 tooth system on the gearwheel
13 fastening element
14 rotation angle
15 linear travel
16 axis of rotation
17 circular path
18 axis
20 actuator device
21 gearing arrangement
22 housing
23 device
24 lead screw
P1 point of reversal of the direction of rotation

The invention claimed is:
1. A gearing arrangement for an actuator device for height adjustment of a vehicle body, the gearing arrangement comprising:
an input wheel;
an output wheel rotatably connected to the input wheel by a tooth system formed thereon and a corresponding tooth system formed on the input wheel;
a blocking element configured to block a rotational movement arranged on the output wheel;
at least one guide track on the blocking element, the at least one guide track having at least one blocking stop integrated therein and at least one deflection location;
a pin section that is connected to the at least one guide track, the pin section is movable and is configured to be guided along the at least one guide track upon rotation of the output wheel and to block a rotational movement of the output wheel upon penetrating into the at least one blocking stop; and
a rotative position of the blocking element is detectable by the at least one deflection location during the guidance of the pin section by the at least one deflection location.

2. The gearing arrangement as claimed in claim 1, further comprising a lever arm, the pin section is formed on the lever arm, the lever arm is pivotable about an axis of rotation, the pin section engages radially or axially in the at least one guide track, and the lever arm is configured for detecting the rotative position of the blocking element by a rotation angle during the guidance of the pin section by the at least one deflection location.

3. The gearing arrangement as claimed in claim 2, wherein the lever arm has a clamping fit relative to a component fixed in a stationary position, and the guide track sets a location of the lever arm counter to a friction force of the clamping fit.

4. The gearing arrangement as claimed in claim 1, further comprising a linear guide, and the pin section is arranged on the linear guide, the linear guide is configured to guide the pin section along a linear axis and, by a linear travel, for detection of the rotative position of the blocking element during the guidance of the pin section by the deflection location, and the pin section engages radially or axially in the at least one guide track.

5. The gearing arrangement as claimed in claim 1, wherein the at least one guide track comprises a first guide track section and a second guide track section.

6. The gearing arrangement as claimed in claim 5, wherein
the pin section is guidable substantially along the first guide track section for a first direction of rotation of the output wheel, the pin section is guidable substantially along the second guide track section for a second direction of rotation of the output wheel, and the second guide track section includes the blocking stop.

7. The gearing arrangement as claimed in claim 1, wherein the blocking element comprises a blocking disk, and the guide track is formed on a front face thereof.

8. The gearing arrangement as claimed in claim 1, wherein the blocking element comprises a blocking ring, and the guide track is formed on a circumference of the blocking ring.

9. An actuator device for height adjustment of a vehicle body, comprising a gearing arrangement as claimed in claim 1.

10. An actuator device for height adjustment of a vehicle body, the actuator comprising:
a housing;
a gear wheel comprising a spindle nut connected to the housing;
a lead screw located in the spindle nut; and
a gearing arrangement including:
an input wheel;
an output wheel rotatably connected to the gear wheel and rotatably connected to the input wheel by a tooth system formed thereon;
a blocking element configured to block a rotational movement arranged on the output wheel;
a guide track on the blocking element, the guide track having at least one blocking stop integrated therein and a deflection location;
a pin section that is connected to the guide track, the pin section is movable and is configured to be guided along the guide track upon rotation of the output wheel and to block a rotational movement of the output wheel upon penetrating into the at least one blocking stop; and
a rotative position of the blocking element is detectable by the deflection location during the guidance of the pin section by the deflection location.

11. The actuator device according to claim 10, further comprising a lever arm, the pin section is formed on the lever arm, the lever arm is pivotable about an axis of rotation, the pin section engages radially or axially in the guide track, and the lever arm is configured for detecting the rotative position of the blocking element by a rotation angle during the guidance of the pin section using the at least one deflection location.

12. The actuator device according to claim 11, wherein the lever arm has a clamping fit relative to a component fixed in a stationary position, and the guide track sets a location of the lever arm counter to a friction force of the clamping fit.

13. The actuator device according to claim 10, further comprising a linear guide, and the pin section is arranged on the linear guide, the linear guide is configured to guide the pin section along a linear axis and, by a linear travel, for detection of the rotative position of the blocking element during the guidance of the pin section using the deflection location, and the pin section engages radially or axially in the at least one guide track.

14. The actuator device according to claim 10, wherein the at least one guide track comprises a first guide track section and a second guide track section.

15. The actuator device according to claim 14, wherein the pin section is guidable along the first guide track section for a first direction of rotation of the output wheel, the pin section is guidable along the second guide track section for a second direction of rotation of the output wheel, and the second guide track section includes the blocking stop.

16. The actuator device according to claim 10, wherein the blocking element comprises a blocking disk, and the guide track is formed on a front face thereof.

17. The actuator device according to claim 10, wherein the blocking element comprises a blocking ring, and the guide track is formed on a circumference of the blocking ring.

* * * * *